US009759902B2

(12) United States Patent
Sharma et al.

(10) Patent No.: US 9,759,902 B2
(45) Date of Patent: Sep. 12, 2017

(54) SYSTEM, METHOD AND COMPUTER-ACCESSIBLE MEDIUM FOR AUTHENTICATING PHYSICAL OBJECTS USING MICROSCOPIC TEXTURES

(71) Applicant: New York University, New York, NY (US)

(72) Inventors: Ashlesh Sharma, Redmond, WA (US); Vidyuth Srinivasan, Bangalore (IN); Lakshminarayanan Subramanian, New York, NY (US)

(73) Assignee: New York University, New York, NY (US)

( * ) Notice: Subject to any disclaimer, the term of this patent is extended or adjusted under 35 U.S.C. 154(b) by 32 days.

(21) Appl. No.: 14/905,573

(22) PCT Filed: Jul. 21, 2014

(86) PCT No.: PCT/US2014/047444
§ 371 (c)(1),
(2) Date: Jan. 15, 2016

(87) PCT Pub. No.: WO2015/010126
PCT Pub. Date: Jan. 22, 2015

(65) Prior Publication Data
US 2016/0178881 A1    Jun. 23, 2016

Related U.S. Application Data

(60) Provisional application No. 61/856,161, filed on Jul. 19, 2013.

(51) Int. Cl.
*G06K 9/68* (2006.01)
*G02B 21/36* (2006.01)
(Continued)

(52) U.S. Cl.
CPC ............ *G02B 21/365* (2013.01); *G02B 9/62* (2013.01); *G02B 13/18* (2013.01); *G02B 13/24* (2013.01);
(Continued)

(58) Field of Classification Search
CPC ........ G02B 21/02; G02B 21/365; G02B 9/62; G02B 13/18; G02B 13/24; G02B 7/022;
(Continued)

(56) References Cited

U.S. PATENT DOCUMENTS 5,392,431 A    2/1995  Pfisterer
7,580,127 B1 *  8/2009  Mayor ................... G01N 21/21
                                                            356/337
(Continued)

FOREIGN PATENT DOCUMENTS

CN    202119967    1/2012
JP    2007-304224    11/2007
(Continued)

OTHER PUBLICATIONS

International Search Report for International Application No. PCT/US2014/047444 mailed on Jan. 12, 2015.
(Continued)

*Primary Examiner* — Ali Bayat
(74) *Attorney, Agent, or Firm* — Andrews Kurth Kenyon LLP

(57) ABSTRACT

An exemplary lens arrangement can be provided that includes a plurality of lenses configured to provide a field of view (FOV) of between about 9 mm×6 mm to about 15 mm×12 mm, a resolution at at least one edge of the lenses of between about 40 lp/mm to about 100 lp/mm, and a distortion between about 0.1% to about 1%.

20 Claims, 8 Drawing Sheets

(51) Int. Cl.
  *G02B 9/62* (2006.01)
  *G02B 13/18* (2006.01)
  *G02B 21/02* (2006.01)
  *G06K 9/20* (2006.01)
  *G06K 9/62* (2006.01)
  *G02B 13/24* (2006.01)
  *G02B 7/02* (2006.01)

(52) U.S. Cl.
  CPC .............. *G02B 21/02* (2013.01); *G06K 9/209* (2013.01); *G06K 9/2027* (2013.01); *G06K 9/2036* (2013.01); *G06K 9/6202* (2013.01); *G02B 7/022* (2013.01); *G06K 2009/6213* (2013.01)

(58) Field of Classification Search
  CPC .............. G06K 2009/6213; G06K 9/00; G06K 9/2027; G06K 9/2036; G06K 9/209; G06K 9/6202; G01N 2021/1793; G01N 21/01; G01N 21/87; G01N 33/381; G03B 21/142; G03B 37/00
  See application file for complete search history.

(56) References Cited

U.S. PATENT DOCUMENTS

| | | | | |
|---|---|---|---|---|
| 7,848,027 | B2 * | 12/2010 | Yoshida | G02B 9/64 359/656 |
| 8,864,309 | B2 * | 10/2014 | Buckland | A61B 3/102 351/206 |
| 9,030,750 | B2 * | 5/2015 | Yoshida | G02B 21/02 359/565 |
| 9,402,540 | B2 * | 8/2016 | Buckland | A61B 3/102 |
| 2009/0213334 | A1 | 8/2009 | Artonne et al. | |
| 2011/0228063 | A1 | 9/2011 | Smith et al. | |
| 2013/0169595 | A1 | 7/2013 | Chang et al. | |
| 2016/0313537 | A1 * | 10/2016 | Mercado | G02B 9/60 |
| 2016/0341934 | A1 * | 11/2016 | Mercado | G02B 9/62 |

FOREIGN PATENT DOCUMENTS

| | | |
|---|---|---|
| JP | 2007-325793 | 12/2007 |
| WO | WO 94/17493 | 8/1994 |
| WO | WO 2012/126008 | 9/2012 |

OTHER PUBLICATIONS

International Written Opinion for International Application No. PCT/US2014/047444 mailed on Jan. 12, 2015.
Ashlesh Sharma, et al. Microscopic paper fingerprinting. In SPIE Newsroom, Apr. 16, 2012.
Ashlesh Sharma, et al. Paperspeckle: microscopic fingerprinting of paper. In ACJVI Conference on Computer and Communications Security, pp. 99-110, 2011.
Extended European Search Report dated May 9, 2017 based on European Patent Application No. 14826570.5.

* cited by examiner

SYSTEM, METHOD AND COMPUTER-ACCESSIBLE MEDIUM FOR AUTHENTICATING PHYSICAL OBJECTS USING MICROSCOPIC TEXTURES

CROSS-REFERENCE TO RELATED APPLICATIONS

This application relates to and claims the benefit and priority from International Patent Application No. PCT/US2014/047444 filed on Jul. 21, 2014, which claims the benefit and priority from U.S. Provisional Patent Application No. 61/856,161, filed on Jul. 19, 2013, the entire disclosures of which are incorporated herein by reference.

FIELD OF THE DISCLOSURE

The present disclosure relates generally to an exemplary system, method and computer-accessible medium for authenticating an object, and more specifically, to exemplary embodiments of an exemplary system, method and computer-accessible medium for authenticating an object using microscopic textures based on images from an exemplary lens system.

BACKGROUND INFORMATION

Forgery and counterfeiting of products can be a major problem worldwide where the losses can be in the billions of dollars. Various technologies such as holograms, radio frequency identification ("RFID") tags, microprints and taggants have been used in the identification and authentication of products. However, these technologies have had very limited success in alleviating the counterfeiting of goods.

Thus, it may be beneficial to provide exemplary lens system/arrangement for authenticating an object that can overcome at least some of the deficiencies described herein above.

SUMMARY OF EXEMPLARY EMBODIMENTS

An exemplary lens arrangement can be provided that can include a plurality of lenses configured to provide a field of view ("FOV") of between about 9 mm×6 mm to about 15 mm×12 mm, a resolution at an edge(s) of the lenses of between about 40 lp/mm to about 100 lp/mm, and a distortion between about 0.1% to about 1%. The FOV can be about 12 mm×9 mm. The resolution at the edge(s) of the lenses can be about 100 lp/mm. The distortion can be about 1%. An LED arrangement(s) can be configured to directly illuminate an object near the lenses.

In some exemplary embodiments of the present disclosure, the exemplary lenses can have a Double Gauss architecture, which can be asymmetrical. The lenses can be mounted on a threaded collar arrangement. A connection arrangement, which can include Bluetooth, Wi-Fi, Ethernet or USB, can be configured to transmit an image provided by the lenses. The lenses can be provided in a configuration so as to authenticate an object(s).

In another exemplary embodiment of the present disclosure can be a lens arrangement including at least six lenses, at least three of the lenses can each have a convex surface and a concave surface, at least two of the lenses can each have two convex surfaces, and at least one of the lenses can have two concave surfaces. A first lens of the at least three of the lenses can have a first side which can have a convex surface and a second side which can have a concave surface. A second lens of the at least three of the lenses can have a third side which can have a concave surface and a fourth side which can have a convex surface, the third side can be adjacent to the second side of the first lens. A third lens of the at least three of the lenses can have a fifth side which can have a concave surface and a sixth side which can have a convex surface, the fifth side can be adjacent to the fourth side of the second lens. A fourth lens of the at least two of the lenses can have a seventh side which can have a convex surface and an eighth side which can have a convex surface, the seventh side can be adjacent to the sixth side of the third lens. A fifth of the at least one of the lenses can have a ninth side which can have a concave surface and a tenth side which can have a concave surface, the ninth side can be adjacent to the eighth side of the fourth lens. A sixth lens of the at least two of the lenses can have an eleventh side which can have a convex surface and a twelfth side which can have a convex surface, the eleventh side can be adjacent to the tenth side of the fifth lens. A space between each of the lenses can be about 5 microns. The lenses can be provided in a configuration so as to authenticate at least one object.

In another exemplary embodiment is an exemplary system, method and computer-accessible medium for enrolling an object(s) for verification, which can include, for example receiving information related to a texture of the object(s) and enrolling the object(s) for verification by storing the information in a database(s). The information can be generated by a lens arrangement, which can include for example, (i) a field of view (FOV) of between about 9 mm×6 mm to about 15 mm×12 mm, a resolution at at least one edge of the lenses of between about 40 lp/mm to about 100 lp/mm, and a distortion between about 0.1% to about 1%, and/or (ii) at least six lenses, wherein at least three of the lenses each have a convex surface and a concave surface, at least two of the lenses each has two convex surfaces, and at least one of the lenses has two concave surfaces.

In some exemplary embodiments of the present disclosure, the information can be generated by causing a variation of a lighting condition(s), a wavelength(s) or a focal length(s) on a surface of the object(s). The first information can be linked to catalog information of the object(s). The catalog information can include a serial number, a barcode, a name, a model number, a material(s), a spectral property(s) or a composition(s). The system, method and computer-accessible medium can be provided on a mobile device, which can be a mobile phone. A local descriptor(s) and a global descriptor(s) can be generated based on the information. Further information can be received that is related to a further texture of the object(s), a further local descriptor(s) and further global descriptor(s) can be generated based on the further information. The further local descriptor(s) can be compared to the local descriptor(s) and the further global descriptor(s) can be compared to the global descriptor(s). The authenticity of the object(s) can be verified if (i) the further local descriptor(s) can substantially match the local descriptor(s) and (ii) the further global descriptor(s) can substantially matches the global descriptor(s).

In some exemplary embodiments of the present disclosure, the authenticity can be verified if the match can be above a particular threshold, and or if key-point coordinates of the further local descriptor(s) and the further global descriptor(s) can satisfy a geometric consistency property. In some exemplary embodiments of the present disclosure, further information related to a further texture of the object(s) can be received, it can be compared to the first information and the authenticity of the object(s) can be verified if the further information can substantially matches the first information. The object(s) can include (i) luxury goods, (ii) pharmaceuticals, (iii) cosmetics, (iv) toys, (v) sporting goods, (vi) art and collectibles, (vii) bearer bonds and coupons, (viii) consumer goods, (ix) electronics or (x) paper documents.

In another exemplary embodiment of the present disclosure is an exemplary system, method and computer-accessible medium for verifying an authenticity of an object(s), which can include, for example, receiving information related to a texture of the object(s), comparing the texture to a further texture(s) stored in a database(s), and verifying the authenticity of the one object(s) if the texture can substantially match the further texture(s). The information can be generated by (i) a lens arrangement, which can include at least six lenses, wherein at least three of the lenses each have a convex surface and a concave surface, at least two of the lenses each has two convex surfaces, and at least one of the lenses has two concave surfaces, and/or a lens arrangement having a field of view (FOV) of between about 9 mm×6 mm to about 15 mm×12 mm, a resolution at at least one edge of the lenses of between about 40 lp/mm to about 100 lp/mm, and a distortion between about 0.1% to about 1%, These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
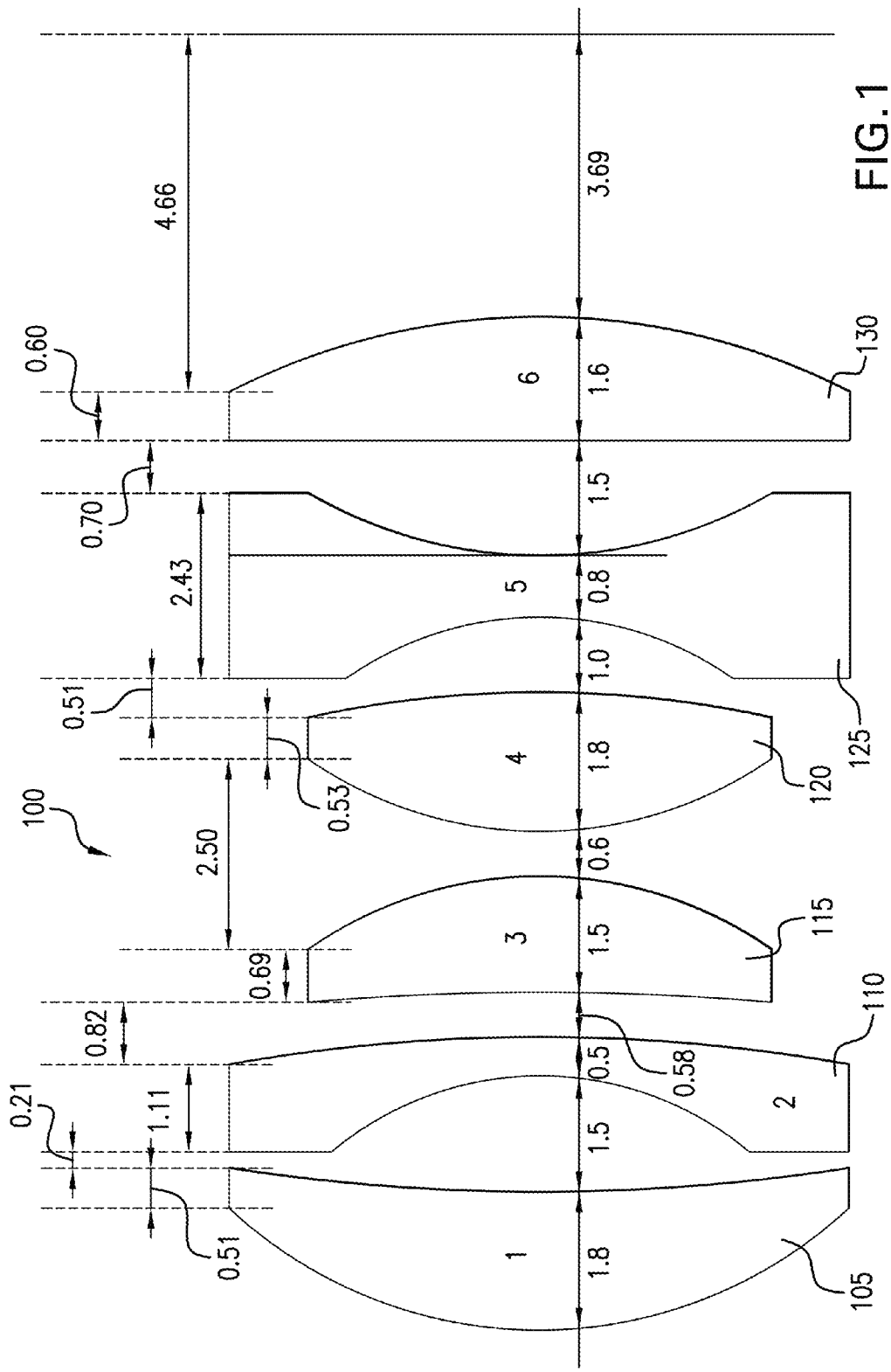
FIG. 1 is an exemplary schematic diagram of an exemplary lens architecture/configuration according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

The exemplary system, method and computer accessible medium according to an exemplary embodiment of the present disclosure can capture and process microscopic textures from physical objects to render each object unique. The exemplary system, method and computer accessible medium can be based on the concept of TextureSpeckles (see, e.g., References 1 and 2) which can capture microscopic textures from the interaction of multiple scattering of light with the underlying complex microscopic structure of the object. The exemplary system and/or components thereof can have specific properties that can make it beneficial for capturing microscopic textures of various surfaces, objects and materials.

The exemplary system, method and computer accessible medium can include an optical system/arrangement/apparatus, a mechanical system/arrangement/apparatus, and various electronics, as described in further detail herein.

Exemplary Optical System

The exemplary optical system, according to an exemplary embodiment of the present disclosure, can include a lens structure, a sensor and/or an illumination system. The lens structure can be or can include an asymmetrical Double Gauss architecture designed to extract images at fixed magnifications. The f-stop can vary from, for example, about f/12.5 to about f/2.5 and the magnification factor (e.g., ratio of object height divided by the image height) can be about 0.5. The field of view ("FOV") of the lens structure can vary from about 9 mm×6 mm to about 15 mm×12 mm. In one exemplary embodiment, the FOV can be about 12 mm×9 mm. FIG. 1 illustrates a variable lens structure having a fixed focus lens system. The exemplary system, method and computer-accessible medium, according to an exemplary embodiment of the present disclosure, as shown in FIG. 1, can have an exemplary mechanical lens configuration 100 described below in Table 1. It should be noted that the dimensions shown in FIG. 1 and Table 1 are for exemplary purposes only, and other exemplary dimensions can be used.

TABLE 1

| | | |
|---|---|---|
| Lens No. 1 (element 105) | LEFT SURFACE | 5.835 (VEX) |
| | RIGHT SURFACE | 26.708 (CAVE) |
| Lens No. 2 (element 110) | LEFT SURFACE | 4.176 (CAVE, DIA 5.4) |
| | RIGHT SURFACE | 21.455 (VEX) |
| Lens No. 3 (element 115) | LEFT SURFACE | 32.683 (CAVE) |
| | RIGHT SURFACE | 5.213 (VEX) |
| Lens No. 4 (element 120) | LEFT SURFACE | 5.213 (VEX) |
| | RIGHT SURFACE | 14.264 (VEX) |
| Lens No. 5 (element 125) | LEFT SURFACE | 4.261 (CAVE, DIA 5) |
| | RIGHT SURFACE | 5.858 (CAVE, DIA 6) |

TABLE 1-continued

| Lens No. 6 (element 130) | LEFT SURFACE | 276.23 (VEX) |
|---|---|---|
| | RIGHT SURFACE | 8.70 (VEX) |

The exemplary illumination can be provided by, for example, light-emitting diodes ("LED"s) in the front (e.g., periphery) of the barrel of the lens structure. For uniform illumination, both direct illumination from about 4-8 LEDs on the periphery, and diffuse direct illumination based on a light shaping diffuser, can be used.

The exemplary optical system can be provided for a range of wavelengths from, for example, about 300 nm to about 700 nm. Exemplary graphs of a Modulation Transfer Function ("MTF") corresponding to each range of the wavelength, according to exemplary embodiments of the present disclosure, are shown in FIGS. 2-5.

As illustrated in FIGS. 2-5, the exemplary spatial resolution of the optical system can be about 160 lp/mm at the center. The resolution at the edges can vary from about 12 microns or 40 lp/mm to about 5 microns or about 100 lp/mm. The exemplary optical performance can be close to its diffraction limit (e.g., the theoretical limit of resolution of an optical system given by $\frac{\lambda}{2n\sin(\theta)}$, where $\lambda$ can be the wavelength of light, $n\sin(\theta)$ can be the numerical aperture). Since the exemplary optical system can be diffraction-limited, it can process microscopic textures at high resolutions.

Figure 2:
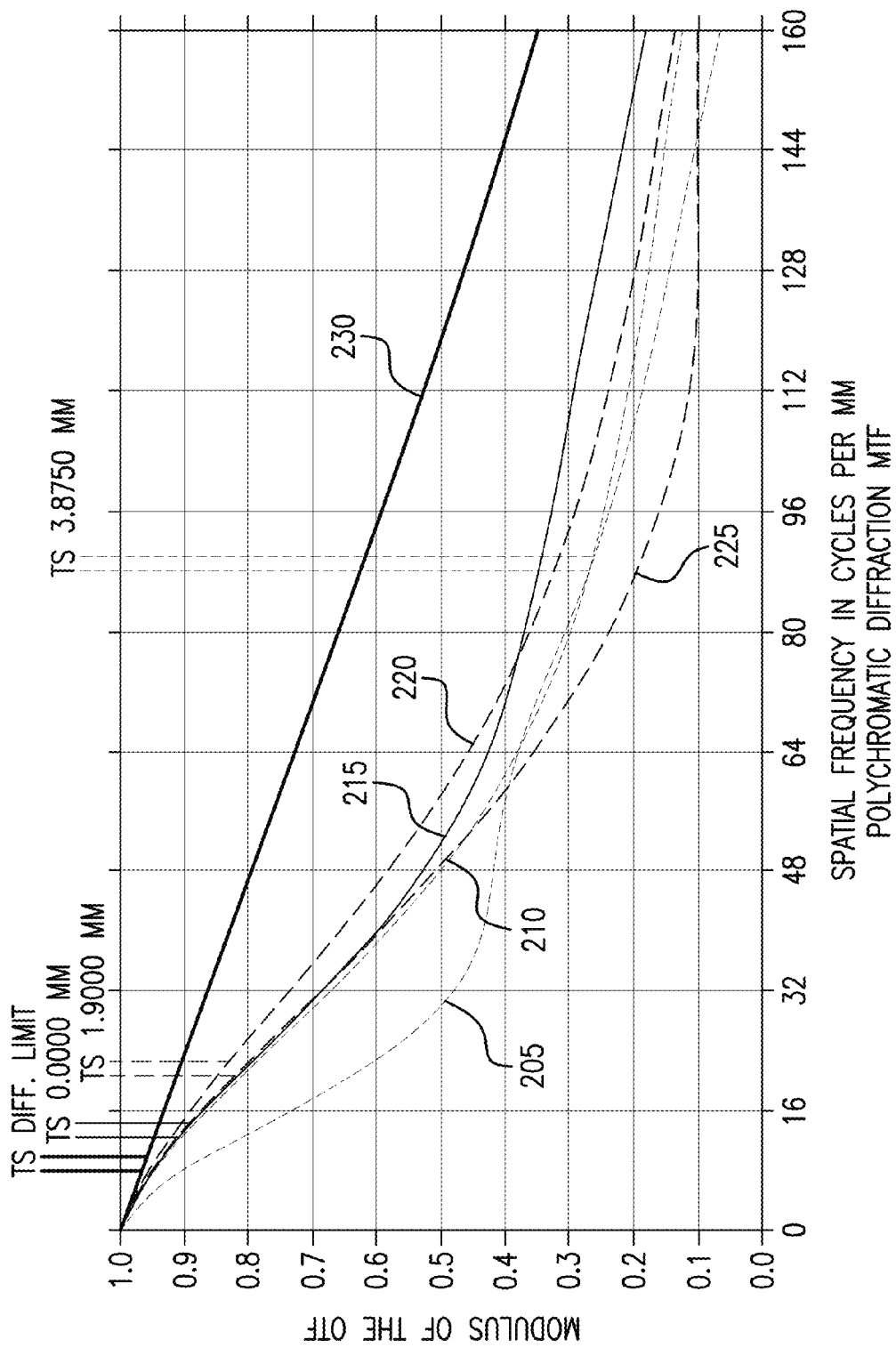
FIG. 2 is an exemplary graph of a Modulation Transfer Function ("MTF") for a wavelength range of about 400 nm to about 656 nm according to an exemplary embodiment of the present disclosure.

FIG. 2 illustrates an exemplary MTF of the exemplary lens system having a wavelength range of about 400 nm to about 656 nm across three points (e.g., center of about 1.9 mm by about 3.875 mm) in the sensor area. Elements/lines 205 and 210 illustrate the tangential and sagittal MTF at about 3.875 mm (e.g., from the center of the sensor). Element/line 215 illustrates the tangential and sagittal MTF at the center of the sensor. Elements/lines 220 and 225 illustrate the tangential and sagittal MTF at about 1.9 mm. Element/line 230 illustrates the diffraction limit MTF of the entire exemplary lens system/apparatus.

Figure 3:
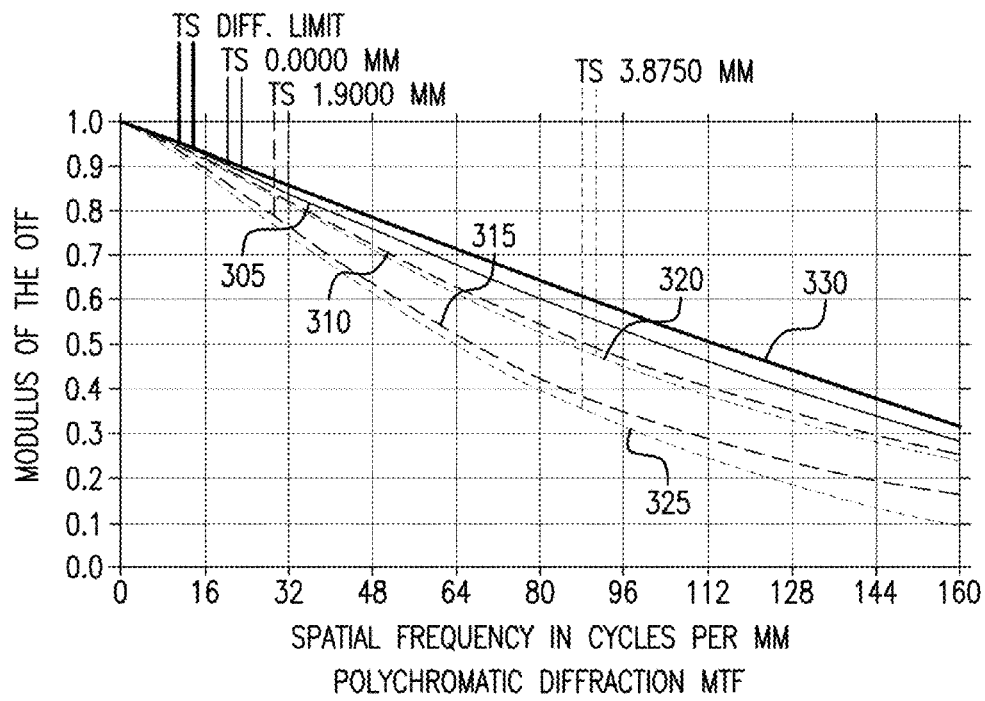
FIG. 3 is an exemplary graph of a MTF for a wavelength range of about 486 nm to about 656 nm according to an exemplary embodiment of the present disclosure.

FIG. 3 illustrates a further exemplary MTF of the exemplary lens system having a wavelength range of about 486 nm to about 656 nm across three points (e.g., center of about 1.9 mm by about 3.875 mm) in the sensor area. Element/line 305 illustrates the tangential and sagittal MTF at the center of the sensor. Elements/lines 310 and 315 illustrate the tangential and sagittal MTF at about 1.9 mm. Elements/lines 320 and 325 illustrate the tangential and sagittal MTF at about 3.875 mm. Element/line 330 illustrates the exemplary diffraction limit MTF of the entire exemplary lens system/apparatus.

Figure 4:
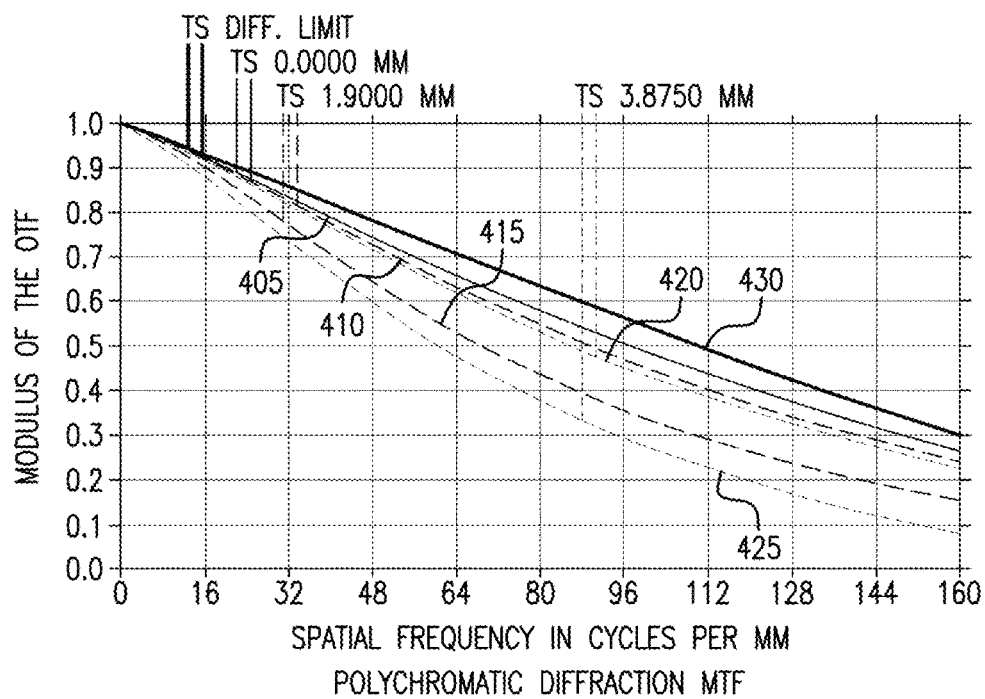
FIG. 4 is an exemplary graph of a MTF for a wavelength range of about 486 nm to about 720 nm according to an exemplary embodiment of the present disclosure.

FIG. 4 illustrates an even further exemplary MTF of the exemplary lens system in the wavelength range of about 486 nm to about 720 nm across three points (e.g., center of about 1.9 mm by about 3.875 mm) in the sensor area. Element/line 405 illustrates the tangential and sagittal MTF at the center of the sensor. Elements/lines 410 and 415 illustrate the tangential and sagittal MTF at about 1.9 mm. Elements/lines 420 and 425 illustrate the tangential and sagittal MTF at about 3.875 mm. Element/line 430 illustrates the diffraction limit MTF of the exemplary lens system/apparatus.

Figure 5:
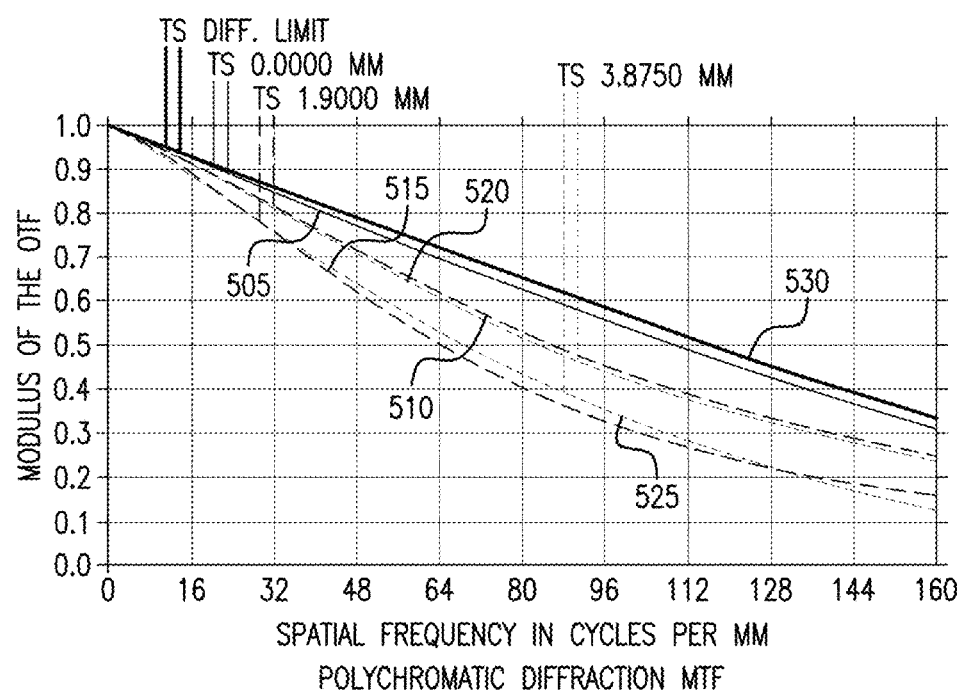
FIG. 5 is an exemplary graph of a MTF for a wavelength range of about 500 nm to about 620 nm according to an exemplary embodiment of the present disclosure.

FIG. 5 illustrates still an even further exemplary MTF of the exemplary lens system in the wavelength range of about 500 nm to about 620 nm across three points (e.g., center of about 1.9 mm by about 3.875 mm) in the sensor area. Element/line 505 illustrates the tangential and sagittal MTF at the center of the sensor. Elements/lines 510 and 515 illustrate the tangential and sagittal MTF at about 1.9 mm. Elements/lines 520 and 525 illustrate the tangential and sagittal MTF at about 3.875 mm. Element/line 530 illustrates the exemplary diffraction limit MTF of the exemplary lens system/apparatus.

Figure 6:
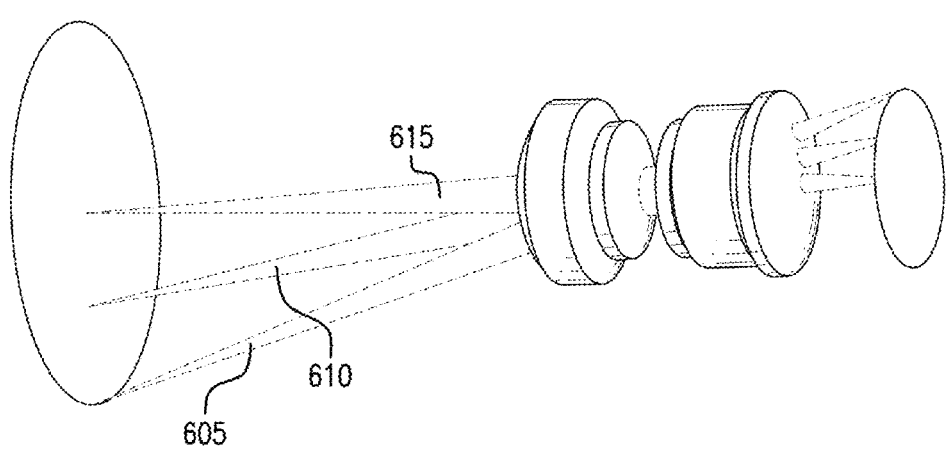
FIG. 6 is an exemplary diagram of an optical configuration and an associated ray pattern analysis using Monte-Carlo simulations according to an exemplary embodiment of the present disclosure.

A Monte-Carlo ray tracing procedure can be used to simulate the light of specific wavelengths in order to ensure consistency across optical systems. FIG. 6 illustrates exemplary ray patterns from exemplary objects to the sensor across the lens setup, according to the exemplary embodiment of the present disclosure. Element/beam 605 illustrates the light rays from the edge of the field of view to the edge of the sensor at about 3.875 mm. Element/beam 610 illustrates the light rays from the half-way point in the field of view to the sensor at about 1.9 mm. Element/beam 615 illustrates the light rays from the center of the field of view to the center of the sensor. For the exemplary variable-focus lens system, the f-stop, magnification factor and working distance can change accordingly. The resolution of the exemplary system can be more than about 60 lp/mm which can facilitate the resolution of structures about 7 microns. The exemplary variable-magnification lens system can zoom into an FOV of about 1 mm×1 mm with resolution of about 2 microns.

Exemplary Mechanical System

An exemplary mechanical housing can include a simple casing unit with mechanisms for mounting of an exemplary collar assembly and exemplary electronic components.

Exemplary Barrel and Collar Assembly

Figure 7:
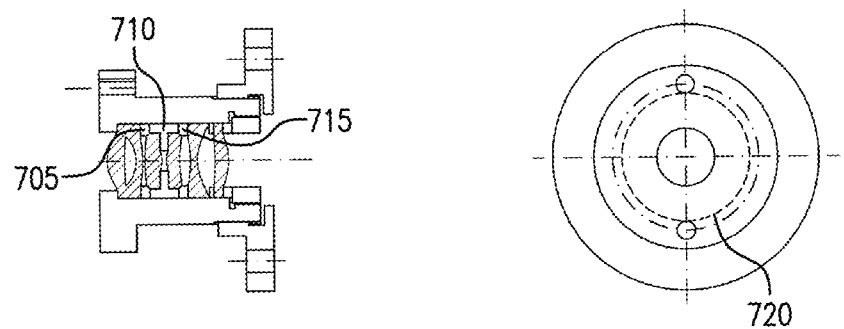
FIG. 7 is a set of side and front views of the exemplary lens structure/configuration and a barrel according to exemplary embodiments of the present disclosure.

An exemplary barrel can be, or can include, a cylinder with a central bore for placement of the exemplary lenses. The inside bore of the barrel can be machined to a high degree of accuracy (e.g., about 5 microns). Spacers can maintain the inter-lens distance, or the air gaps, between lenses. The spacers can also be maintained to a dimensional accuracy of, for example, about 5 microns in the thickness, and up to, for example, about 2-3 microns on the face out and run out. The spacers can maintain the lens centricity. As shown in FIG. 7, spacer numbers 4 and 6 (e.g., elements/components 705 and 715) can have a stepped arrangement to suit various exemplary profiles of smaller lenses. Spacer number 5 (e.g., element 710) can act as an Aperture Stop. Spacer number 5 (e.g., element/component 710) can have a significantly smaller bore as compared to other spacers. On the back end of the barrel bore (e.g., element/component 720), an internal female threading can be provided with a matching male threading. This exemplary arrangement can be used to maintain the lenses in place, and can avoid any movement of lenses during operation.

The complete barrel with lens assembly, according to an exemplary embodiment of the present disclosure, can be mounted on a threaded collar arrangement. The threading on the collar and barrel can facilitate adjusting the focal length of the system. Minor adjustments can be used to achieve desired image sharpness. The collar can be provided with tapped holes to facilitate mounting of the board camera. A central hole in the collar can facilitate the image to be formed on the CMOS sensor in the board camera.

Exemplary Casing

Figure 8:
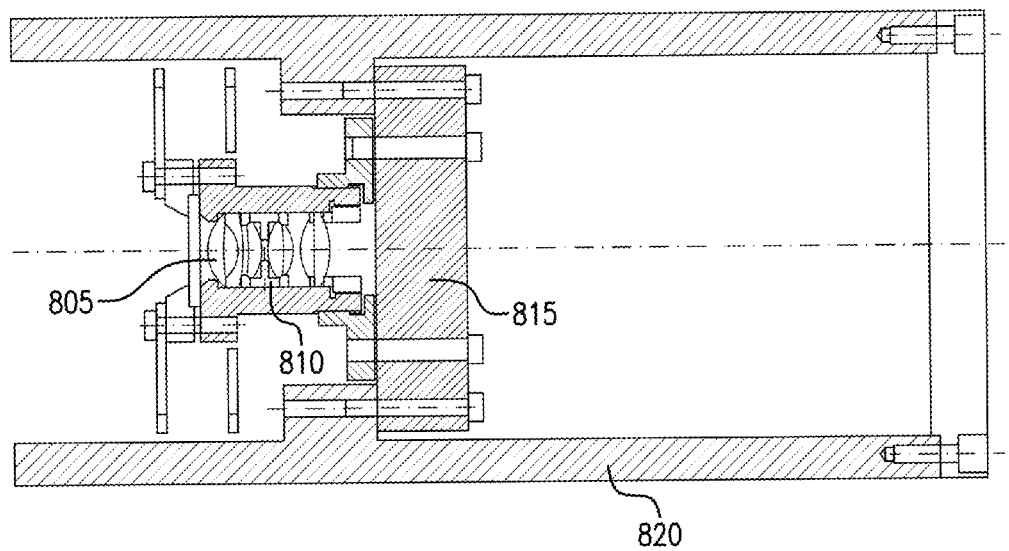
FIG. 8 is schematic cross-sectional view of an internal structure of the lens configuration and a casing according to an exemplary embodiment of the present disclosure.

An exemplary casing can be a square hollow section of aluminum with a mechanism for barrel-collar and board camera assembly. FIG. 8 illustrates exemplary lens 805, spacers 810, barrel 815 and casing 820. The exemplary casing 820 can have a cap arrangement on the top end that can house circuitry for input and/or output ports, for example, a USB 2.0 type A female pin.

The mounting provision inside the casing 820 can be, or can include, a rim that can have a fixed working for a prime lens system. Minor adjustments, for example, telescopic or threaded arrangements, can be provided to incorporate variable magnification and variable focal length lens systems.

An exemplary illumination board (e.g., a printed circuit board ("PCB") fitted with LEDs in a circular fashion) can be fitted or provided in front of the lens barrel assembly. This exemplary configuration can provide a uniform illumination to the FOV. The power for the illumination board can be drawn from the single input-output port on the top of the casing.

Exemplary Electronics

The exemplary electronic components can control (a) the sensor and its functions, (b) image conversion to different formats (e.g., JPEG, TIFF, PNG), (c) communication from the sensor board to USB, Wi-Fi and Bluetooth channels and (d) illumination.

Exemplary Features

The exemplary system, method and computer-accessible medium, according to the exemplary embodiment of the present disclosure, can have different features, which can include the following:

a) Specific focal length: microscopic textures can be rendered unique within a specific range of spatial resolution. The exemplary device can be tuned to extract microscopic textures from specific resolutions such that the uniqueness of the microscopic textures can be preserved.

b) Diffraction-Limited: the exemplary device can be designed such that for the FOV, the imaging system can be diffraction limited.

c) High-Resolution, Low Distortion: the exemplary device can be designed to match, or almost match, the theoretical capability of the lens configuration. This can give a high resolution in the order of, for example, about 7 microns or less. The resolution can be further improved by varying the focal length to achieve higher resolution. The field curve and distortion can be minimal (e.g., within about 0.1%-1%).

d) Asymmetrical Double Gauss Architecture: the exemplary lens architecture can reduce optical aberrations and distortions (e.g., the barrel effect, astigmatism, pin cushion effect, spherical distortion, chromatic aberration and field curvature).

e) Portability and Ease of Use: the exemplary device can be portable (e.g., size: about 50 mm×50 mm×100 mm) and can be used by anyone with little or no help. This is in stark contrast to microscopes that need a precision stand and table to extract images. The exemplary device can simply be placed on top of the object without any stand or table, and the image can be extracted. Since the focus can be fixed, the object's surface can be in focus. Due to this feature, the user can easily register and verify the authenticity of objects.

f) Uniform Illumination: LEDs can be provided in a circular fashion on the periphery of the barrel, which can provide uniform illumination to the field of view. This can facilitate consistent results across multiple devices.

g) Polychromatic: the exemplary system, method and computer accessible medium, according to an exemplary embodiment of the present disclosure, can be designed for use with a polychromatic light source and polychromatic objects. The polychromatic objects can be of any color, and the exemplary system, method and computer accessible medium, according to an exemplary embodiment of the present disclosure, can still extract microscopic textures from it.

h) Shape Invariant: the exemplary device can extract microscopic textures from both two-dimensional ("2D") and three-dimensional ("3D") objects (e.g., the depth of field of the device can be within about 2 mm). The field of view in focus in a 3D object can depend on its curvature.

i) Material Invariant: while some microscopes and devices can be designed to image specific materials, the exemplary system, method and computer-accessible medium can extract microscopic textures from the surface of any type of material (e.g., due to the polychromatic and shape invariant properties).

Exemplary Operation

The exemplary device and system can be used in the following exemplary procedure to identify and authenticate exemplary objects.

Exemplary Registration or Enrollment

The exemplary device/system can be placed in an assembly line, or as part of the industrial process, where the exemplary objects to be registered or enrolled can be manufactured. The exemplary device/system can capture microscopic textures in various forms, for example, by varying the lighting conditions, wavelength, focal length etc. on the surface of objects, and can store the information in a central repository or database. The data received from the exemplary device/system can be transferred through Ethernet, Wi-Fi, Bluetooth, Universal Serial Bus ("USB"), GigEVision ("GiGE") etc. Once the data is stored in the repository or database, it can be processed and converted into key-point information for verification of the object at a later point in time. The microscopic data of the object can be linked to its catalog information such as serial number, barcode, name, model number, material, spectral properties, composition etc. This can facilitate a unique identification of the object during the verification procedure. As the object moves from one node to next node in the transaction chain, its authenticity can be verified by reading the microscopic textures using the exemplary device.

Exemplary Verification

The exemplary system, method and computer accessible medium, according to an exemplary embodiment of the present disclosure, can be used by a user at every node in the supply chain to verify the authenticity of the registered or enrolled object.

For example, for a fixed focus imaging system, the user can place the device on top of the object, or near the surface of the object, in the region where the texture image is to be captured. For the variable focal length device, the user can easily adjust the focus once it has been placed on top of the object or held near the surface of the object. The user can open the application either on a mobile device (e.g., cell phone, personal digital assistant, tablet etc.) or on a computer (e.g., laptop or desktop) to view a live stream/video of the surface of the object. The image of the object can always be "in focus", as the working distance can be fixed from the lens system. For a variable focus version of the device, the user can adjust the focal length to get a non-blurry or focused image.

The user can facilitate the capture of an image, and can transfer/upload the image to a server for processing. The transfer can be either through USB, Wi-Fi and/or Bluetooth etc. The image can be processed either in the exemplary device or in the cloud. The image can be converted to a set of local and global descriptors, either in the exemplary device or in the cloud, and then compared with the set of local and global descriptors in the repository or database. If the matching descriptors can be above a certain threshold, and the key-points coordinates can satisfy the geometric consistency property, then the microscopic textures can be considered a match. The result from the cloud can be sent back to the device. The result can be displayed as, for example, either "authentic" or "unauthentic" or "cannot read". This can signify that the object can either be genuine or fake. If the object can be genuine, the result can contain the detailed meta-data of the object.

Exemplary Applications

The exemplary operation described herein above where once an object can be registered or enrolled, its authenticity can be verified at every node in the supply chain all the way to the end user, and can be applied in various exemplary use-cases. The exemplary device/system and its process of verifying the authenticity of objects can be applied to the following exemplary markets: (1) Luxury goods, (2) Pharmaceuticals, (3) Cosmetics, (4) Toys, (5) Sporting goods, (6) Art & Collectibles, (7) Bearer bonds and coupons, (8) Consumer Goods, (9) Electronics and/or (10) Paper documents Exemplary Enrollment and Verification of Art Exemplary Art Enrollment The artwork can be placed face down on a white paper, or on any paper or cloth-based layer. The exemplary system, method and computer accessible medium, according to an exemplary embodiment of the present disclosure, can extract microscopic textures from the back of the painting or the artwork since the microscopic textures from readings from the painting surface can be inconsistent as time progresses. This can be due to paint fading, variation of pigment color or any other medium that can be used to paint on the canvas.

The exemplary system, method and computer accessible medium, according to an exemplary embodiment of the present disclosure, can extract an image of the artwork (e.g., a scan of the front of the artwork). The unique features of the exemplary microscopic textures that can be extracted from the back of the painting, and can be linked to the microscopic textures from the front of the painting.

Additional associative data related to the artwork and artist can be linked as well. Information such as (1) artist name, (2) title, (3) timestamp and other data related to the artwork can be linked. All the linked information (e.g., unique microscopic features, painting image, artist biographic data, catalog information etc.) can be encrypted and stored in a secure database.

Exemplary Art Verification

The verification process can be similar to the one described above as part of the general verification process.

Exemplary Verification of Manufactured Goods

The exemplary operation can be used to enroll/register various collective objects such as luggage, wallets, purses, handbags, shoes, belts, watches, apparel, golf clubs, sporting equipment, electronics cosmetic products, pharmaceuticals and toys.

Exemplary Manufactured Good Enrollment

All of the above described exemplary collective objects can be enrolled and/or registered during, before or immediately after their production. If the registration is performed before production or assembly, then a specific raw material or materials can be enrolled. Otherwise, the objects can be enrolled individually either as an individual step in their production line or as a separate step post production. Each object can be individually scanned in a specific region, and the area scanned can differ for each type of object based on its shape, size, dimensions, brand requirements, the object's intellectual property requirements, material and the specific production line. Additionally, the meta-data associated with each individual object, depending on the type of collective object, can be integrated with the scan of the individual object. This integrated data can be stored in a secure database for future verification purposes.

Exemplary Enrollment and Verification of Paper Documents, Government Issued Ids & Bearer Bond Coupons Paper documents and bearer bonds can be printed and/or created in various dimensions depending on the issuing authority (e.g., a bank, institution or government body); however, they can generally be printed on paper. This can also include currency, stamps, sale deeds, legal documents, degree certificates, résumés, transaction receipts, charge slips or collectible cards. Government issued IDs can include passports, voter IDs, drivers' licenses, special status cards and visas, although not limited thereto.

Exemplary Enrollment of Paper Documents, Government Issued Ids & Bearer Bond Coupons Printed paper documents, IDs and bearer bonds can be registered at the first point in the transaction chain where the document or bond can be printed or assigned to an entity (e.g., individual or institution), to a specific agreement between parties or monetary value. In case of bearer bonds, the bonds and their associated coupons, if any, can be scanned, and their meta-data can be integrated to ensure that lost coupons can be authenticated if they can be found. The area of surface scanned can vary depending on its dimensions.

Figure 9A:
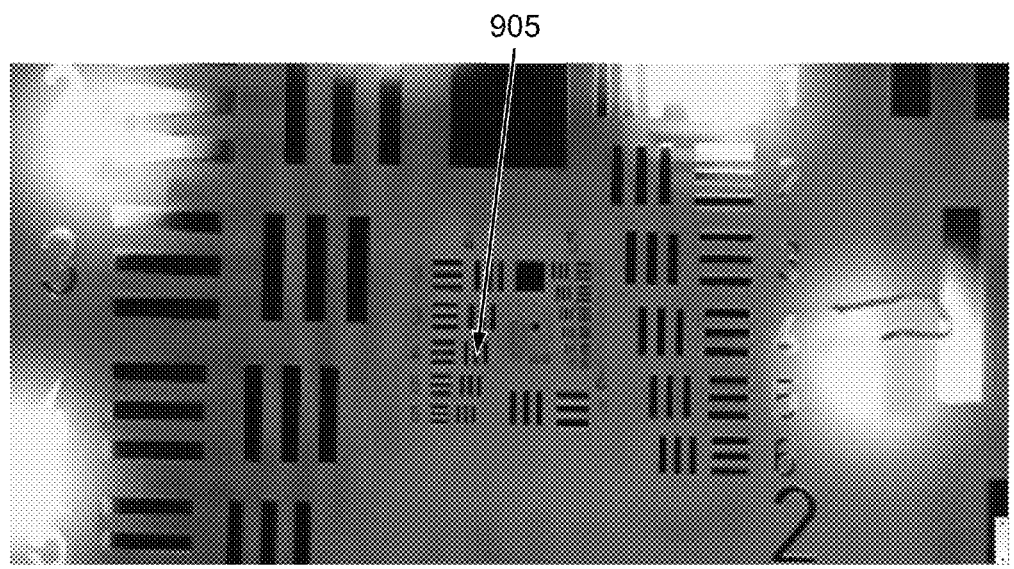
FIG. 9A is an exemplary image obtained using a conventional microscope.
Figure 9B:
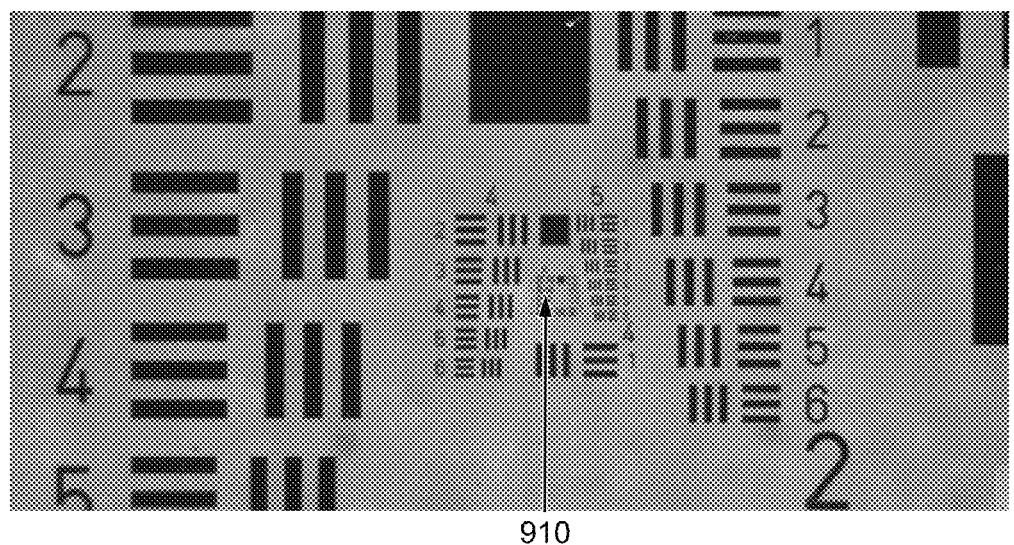
FIG. 9B is an exemplary image generated by an exemplary authentication system according to an exemplary embodiment of the present disclosure.

FIG. 9A illustrates an exemplary image taken by a conventional microscope, and FIG. 9B shows the exemplary image taken by the exemplary system, method and computer-accessible medium according to the exemplary embodiment of the present disclosure. The conventional microscope resolves Group 4, number 4 in the USAF test target image which is around 22 microns or 22 lp/mm as shown in FIG. 9A as element 905. The exemplary system, method and computer-accessible medium according to an exemplary embodiment of the present disclosure can resolve Group 6, number 2 in the USAF test target images which is around 6 microns or about 100 lp/mm, as shown in FIG. 9B as element 910. The image obtained with the conventional microscope also indicates an inconsistency in the illumination.

Figure 10:
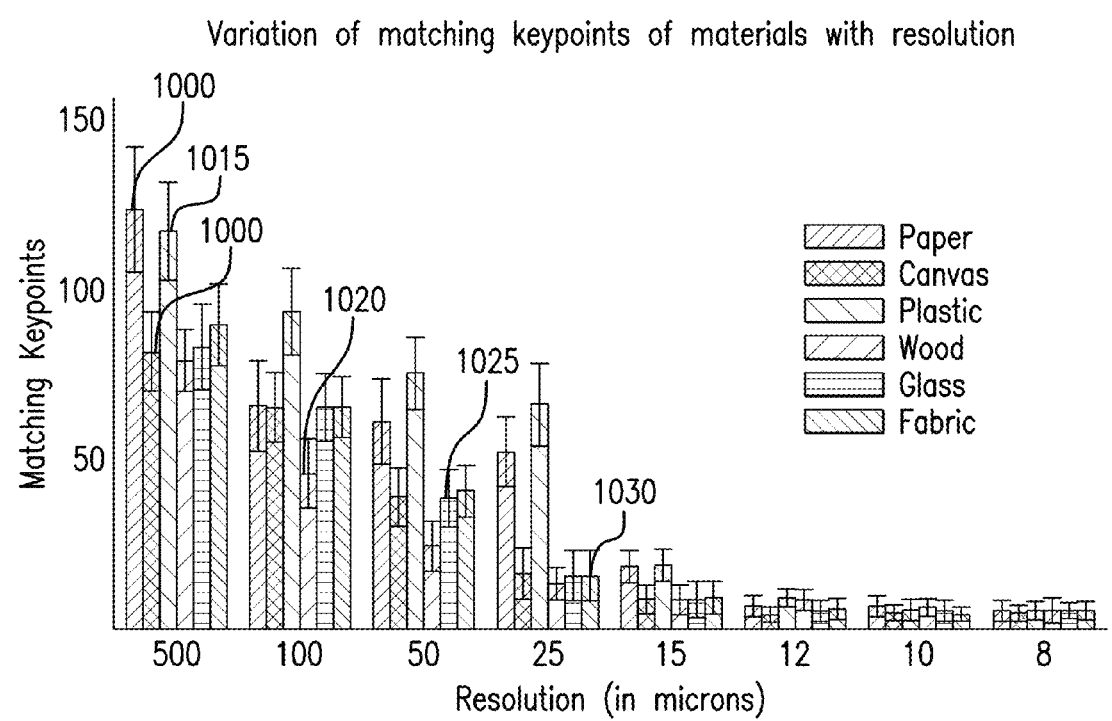
FIG. 10 is an exemplary graph illustrating a spatial resolution versus matching values according to an exemplary embodiment of the present disclosure.

FIG. 10 is an exemplary graph illustrating spatial resolution versus matching values. As the spatial resolution increases, the keypoint matching values can decrease among the pair of the individual surfaces. Thus, each microscopic texture image can be uniquely identified. The exemplary graph shows the variation in matching values as the spatial resolution increases for materials such as canvas 1000, paper 1005, leather, plastic 1015, wood 1020, glass 1025, metals and fabrics 1030. The exemplary device can resolve up to about 100 lp/mm or about 6 microns. As shown in the graph two microscopic textures of materials below about 12 microns can be distinguished.

Exemplary Mechanical Lens Layout

The exemplary system, method and computer-accessible medium can have an exemplary mechanical lens layout detailed below in Table 2 below.

TABLE 2

| Surf:Type | Comment | Radius | Thickness | Glass | Semi-Diameter | |
|---|---|---|---|---|---|---|
| OBJ Standard | | Infinity | 20.880 | | 8.324 | |
| 1* Standard | | 5.850 | 1.800 | BK7 | 4.000 | U |
| 2* Standard | | 26.707 | 1.500 | | 3.000 | U |
| 3* Standard | | −4.170 | 0.500 | N-SF56 | 3.050 | U |
| 4* Standard | | −21.456 | 0.556 | | 4.000 | U |
| 5* Standard | | −32.683 | 1.500 | N-LAK33 | 3.000 | U |
| 6* Standard | | −5.215 | 0.300 | | 3.000 | U |
| STO Standard | | Infinity | 0.300 | | 1.180 | U |
| 8* Standard | | 5.215 | 1.800 | N-LAK33 | 3.000 | U |
| 9* Standard | | −14.264 | 0.949 | | 3.000 | U |
| 10* Standard | | −4.170 | 0.800 | SF2 | 2.500 | U |
| 11* Standard | | 5.850 | 1.566 | | 3.500 | U |
| 12* Standard | | 276.000 | 1.600 | N-LAK33 | 4.000 | U |
| 13* Standard | | −8.700 | 4.900 | V | 4.000 | U |
| IMA Standard | | Infinity | — | | 3.886 | |

Figure 11:
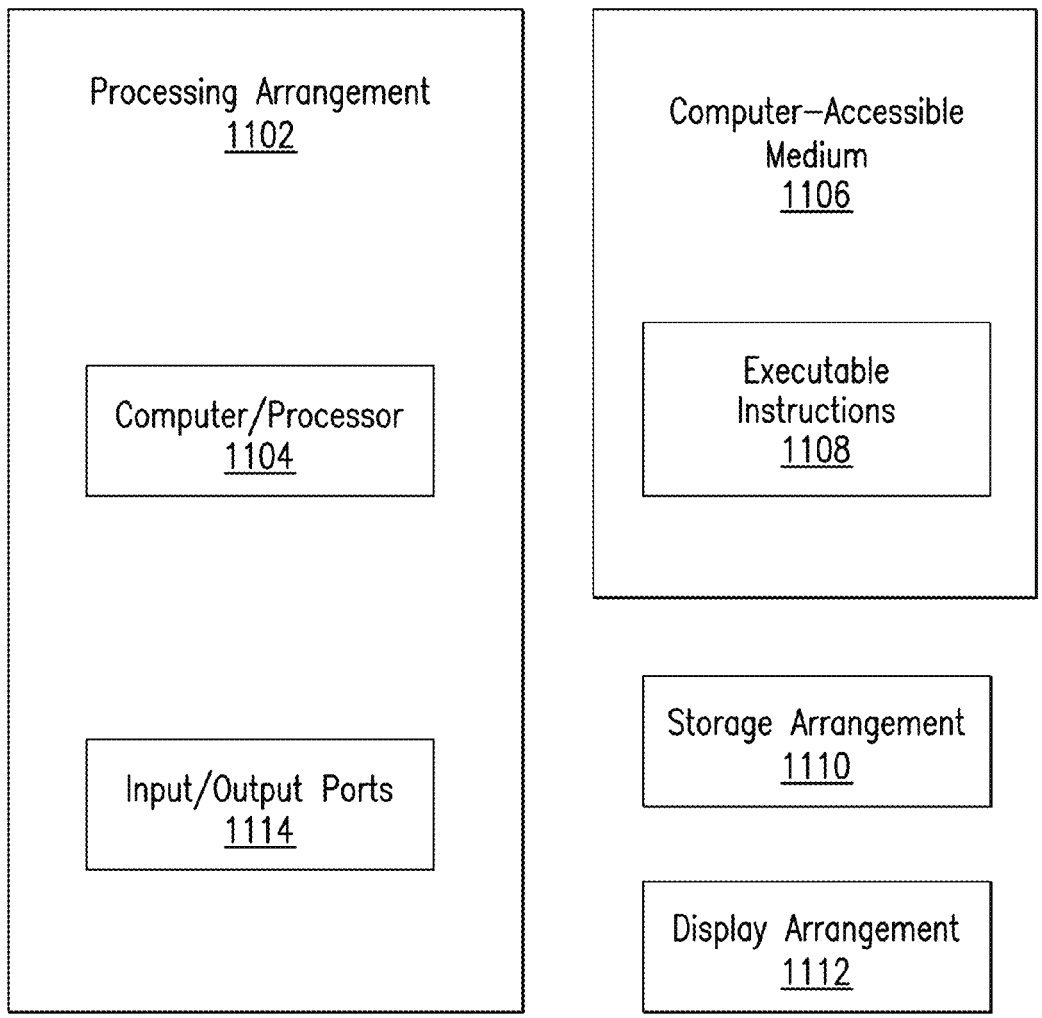
FIG. 11 is an illustration of an exemplary block diagram of an exemplary system in accordance with certain exemplary embodiments of the present disclosure.

FIG. 11 shows a block diagram of an exemplary embodiment of a system according to the present disclosure. For example, exemplary procedures in accordance with the present disclosure described herein can be performed by a processing arrangement and/or a computing arrangement 1102. Such processing/computing arrangement 1102 can be, for example, entirely or a part of, or include, but not limited to, a computer/processor 1104 that can include, for example, one or more microprocessors, and use instructions stored on a computer-accessible medium (e.g., RAM, ROM, hard drive, or other storage device).

As shown in FIG. 11, for example, a computer-accessible medium 1106 (e.g., as described herein above, a storage device such as a hard disk, floppy disk, memory stick, CD-ROM, RAM, ROM, etc., or a collection thereof) can be provided (e.g., in communication with the processing arrangement 1102). The computer-accessible medium 1106 can contain executable instructions 1108 thereon. In addition or alternatively, a storage arrangement 1110 can be provided separately from the computer-accessible medium 1106, which can provide the instructions to the processing arrangement 1102 so as to configure the processing arrangement to execute certain exemplary procedures, processes and methods, as described herein above, for example.

Further, the exemplary processing arrangement 1102 can be provided with or include an input/output arrangement 1114, which can include, for example, a wired network, a wireless network, the internet, an intranet, a data collection probe, a sensor, etc. As shown in FIG. 11, the exemplary processing arrangement 1102 can be in communication with an exemplary display arrangement 1112, which, according to certain exemplary embodiments of the present disclosure, can be a touch-screen configured for inputting information to the processing arrangement in addition to outputting information from the processing arrangement, for example. Further, the exemplary display 1112 and/or a storage arrangement 1110 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] Ashlesh Sharma, Lakshminarayanan Subramanian, and Eric A. Brewer. Microscopic paper fingerprinting. In SPIE Newsroom, 16 Apr. 2012.

[2] Ashlesh Sharma, Lakshminarayanan Subramanian, and Eric A. Brewer. Paperspeckle: microscopic fingerprinting of paper. In ACM Conference on Computer and Communications Security, pages 99-110, 2011.

What is claimed is:

1. A non-transitory computer-accessible medium having stored thereon computer-executable instructions for enrolling at least one physical object for verification, wherein, when a computer arrangement executes the instructions, the computer arrangement is configured to perform procedures comprising:
   receiving information related to a microscopic texture of the at least one physical object; and
   enrolling the at least one physical object for verification by storing the information in at least one database;
   wherein the information is generated by a lens arrangement, comprising:
      a field of view (FOV) of between about 9 mm×6 mm to about 15 mm×12 mm,
      a resolution at at least one edge of the lenses of between about 40 lp/mm to about 100 lp/mm, and
      a distortion between about 0.1% to about 1%.

2. The computer-accessible medium of claim 1, wherein the computer arrangement is further configured to generate the information by causing a variation of at least one of at least one lighting condition, at least one wavelength or at least one focal length on a surface of the at least one physical object.

3. The computer-accessible medium of claim 1, wherein the computer arrangement is further configured to link the information to catalog information of the at least one physical object, wherein the catalog information includes at least one of (i) a serial number, (ii) a barcode, (iii) a name, (iv) a model number, (v) at least one material, (vi) at least one spectral property or (vii) at least one composition.

4. The computer-accessible medium of claim 1, wherein the computer-accessible medium is provided on a mobile device, and further comprising at least one connection arrangement connected to the mobile device configured to transmit the information, and wherein the at least one connection arrangement is at least one of Bluetooth, Wi-Fi, Ethernet or USB.

5. The computer-accessible medium of claim 4, wherein the mobile device is at least one of a mobile phone, a tablet or a personal computer.

6. The computer-accessible medium of claim 1, wherein the computer arrangement is further configured to generate at least one local descriptor and at least one global descriptor based on the information.

7. The computer-accessible medium of claim 6, wherein the computer arrangement is further configured to:
receive further information related to a further microscopic texture of the at least one physical object;
generate at least one further local descriptor and at least one further global descriptor based on the further information;
compare (i) the at least one further local descriptor to the at least one local descriptor and (ii) the at least one further global descriptor to the at least one global descriptor; and
verify an authenticity of the at the at least one physical object if (i) the at least one further local descriptor substantially matches the at least one local descriptor and (ii) the at least one further global descriptor substantially matches the at least one global descriptor.

8. The computer-accessible medium of claim 7, wherein the computer arrangement is further configured to verify the authenticity if the match is above a particular threshold.

9. The computer-accessible medium of claim 7, wherein the computer arrangement is further configured to verify the authenticity if key-point coordinates of the at least one further local descriptor and the at least one further global descriptor satisfy a geometric consistency property.

10. The computer-accessible medium of claim 1, wherein the computer arrangement is further configured to:
receive further information related to a further microscopic texture of the at least one physical object;
compare the further information to the first information; and
verify an authenticity of the at the at least one physical object if the further information substantially matches the first information.

11. The computer-accessible medium of claim 1, wherein the at least one physical object includes at least one of (i) luxury goods, (ii) pharmaceuticals, (iii) cosmetics, (iv) toys, (v) sporting goods, (vi) art and collectibles, (vii) bearer bonds and coupons, (viii) consumer goods, (ix) electronics or (x) paper documents.

12. A method for enrolling at least one physical object for verification, comprising:
receiving information related to a microscopic texture of the at least one physical object; and
using a computer hardware arrangement, enrolling the at least one physical object for verification by storing the information in at least one database;
wherein the information is generated by a lens arrangement, comprising:
a field of view (FOV) of between about 9 mm×6 mm to about 15 mm×12 mm,
a resolution at at least one edge of the lenses of between about 40 lp/mm to about 100 lp/mm, and
a distortion between about 0.1% to about 1%.

13. A system for enrolling at least one physical object for verification, comprising:
a computer arrangement configured to:
receive information related to a microscopic texture of the at least one physical object; and
enroll the at least one physical object for verification by storing the information in at least one database;
wherein the information is generated by a lens arrangement, comprising:
a field of view (FOV) of between about 9 mm×6 mm to about 15 mm×12 mm,
a resolution at at least one edge of the lenses of between about 40 lp/mm to about 100 lp/mm, and
a distortion between about 0.1% to about 1%.

14. The computer-accessible medium of claim 1, wherein the lens arrangement further comprises:
at least six lenses, wherein at least three of the lenses each has a convex surface and a concave surface, at least two of the lenses each has two convex surfaces, and at least one of the lenses has two concave surfaces.

15. The computer-accessible medium of claim 14, wherein (i) a first lens of the at least three of the lenses has a first side having a convex surface and a second side having a concave surface, (ii) a second lens of the at least three of the lenses has a third side having a concave surface and a fourth side having a convex surface, the third side being adjacent to the second side of the first lens, and (iii) a third lens of the at least three of the lenses has a fifth side having a concave surface and a sixth side having a convex surface, the fifth side being adjacent to the fourth side of the second lens.

16. The computer-accessible medium of claim 15, wherein (i) a fourth lens of the at least two of the lenses has a seventh side having a convex surface and an eighth side having a convex surface, the seventh side being adjacent to the sixth side of the third lens, (ii) a fifth lens of the at least one of the lenses has a ninth side having a concave surface and a tenth side having a concave surface, the ninth side being adjacent to the eighth side of the fourth lens, and (iii) a sixth lens of the at least two of the lenses has an eleventh side having a convex surface and a twelfth side having a convex surface, the eleventh side being adjacent to the tenth side of the fifth lens.

17. The computer-accessible medium of claim 14, wherein a space between each of the lenses is about 5 microns.

18. The computer-accessible medium of claim 1, wherein (i) the FOV is about 12 mm×9 min, (ii) the resolution at the at least one edge of the lenses is about 100 lp/mm, and (iii) the distortion is about 1%.

19. The computer-accessible medium of claim 1, wherein the lens arrangement has an asymmetrical Double Gauss architecture.

20. The computer-accessible medium of claim 1, wherein the lens arrangement is mounted on a threaded collar arrangement.

* * * * *